(12) United States Patent
Epps

(10) Patent No.: US 7,717,613 B1
(45) Date of Patent: May 18, 2010

(54) PORTABLE BLENDER WITH SWIVELING BASE

(76) Inventor: Edward Epps, 109 Rhyne Springs Rd., Mount Holly, NC (US) 28120

( * ) Notice: Subject to any disclaimer, the term of this patent is extended or adjusted under 35 U.S.C. 154(b) by 0 days.

(21) Appl. No.: 12/332,257

(22) Filed: Dec. 10, 2008

(51) Int. Cl.
*A47J 43/046* (2006.01)

(52) U.S. Cl. ........................... 366/205; 366/314

(58) Field of Classification Search ......... 366/197–219, 366/314; 99/348; 241/282.1, 282.2
See application file for complete search history.

(56) References Cited

U.S. PATENT DOCUMENTS

| | | | |
|---|---|---|---|
| 3,915,079 A | 10/1975 | Balderson | |
| 4,106,118 A * | 8/1978 | Hoover | 336/185 |
| 4,173,925 A * | 11/1979 | Leon | 99/348 |
| D281,945 S | 12/1985 | Boyce | |
| 4,887,909 A * | 12/1989 | Bennett | 366/199 |
| 4,913,318 A | 4/1990 | Forrester | |
| 6,037,570 A | 3/2000 | Noles | |
| 6,609,821 B2 | 8/2003 | Wulf et al. | |
| 6,959,562 B2 | 11/2005 | Navedo et al. | |
| 2002/0089894 A1 | 7/2002 | Parlor, Sr. | |
| 2006/0193200 A1 | 8/2006 | Herbert | |
| 2007/0119867 A1 | 5/2007 | Nakato et al. | |
| 2008/0018303 A1 | 1/2008 | Scheucher | |

FOREIGN PATENT DOCUMENTS

JP 2002085269 A * 3/2002

* cited by examiner

*Primary Examiner*—Charles E Cooley

(57) ABSTRACT

The invention is an improved portable blender for use in a vehicle that has a self-righting base capable of pivoting in order to balance out the contents contained in the blender while the vehicle is moving. The base also has a power cord with a cigarette lighter adapter.

3 Claims, 7 Drawing Sheets

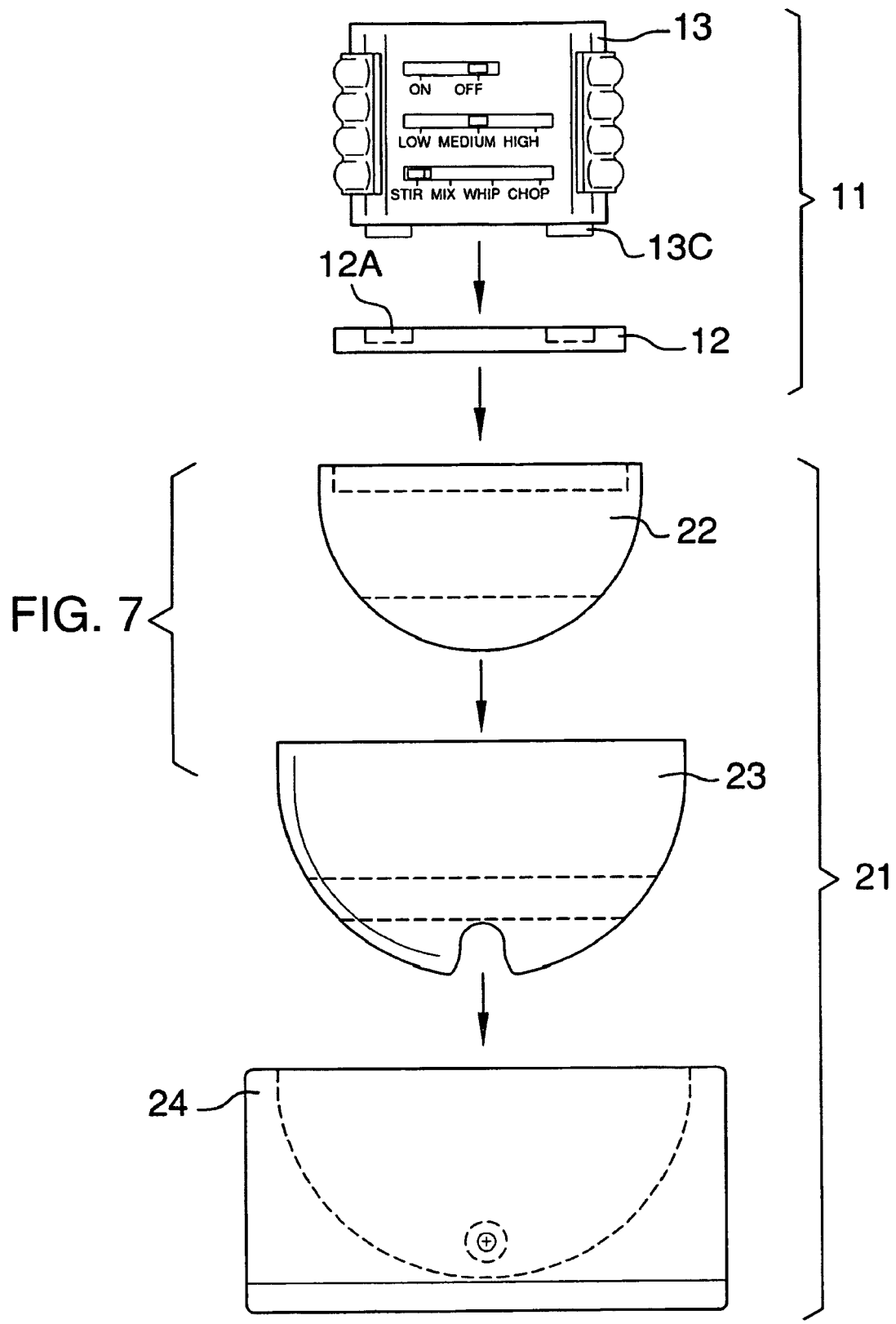

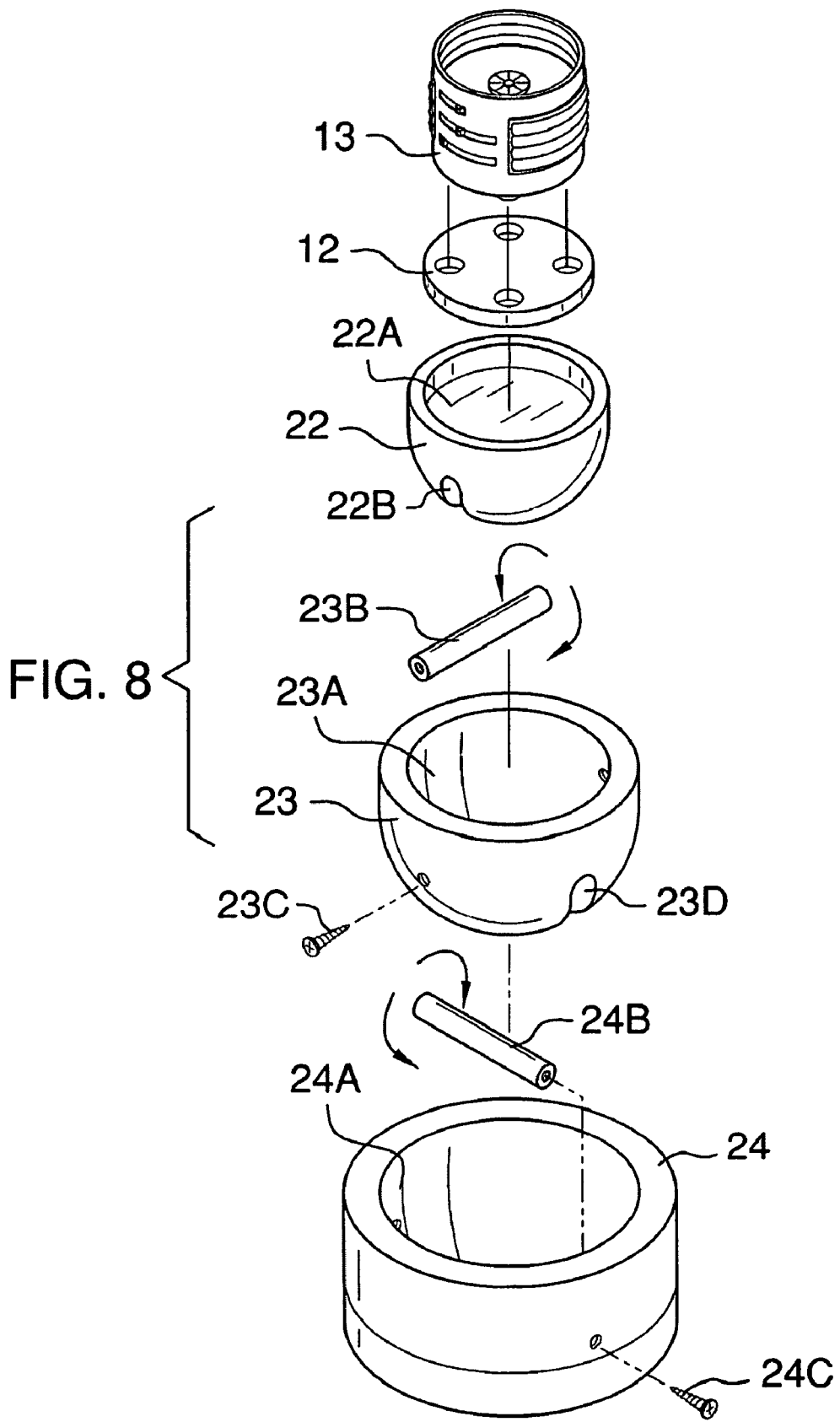

PORTABLE BLENDER WITH SWIVELING BASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of blenders, more specifically, a blender that has a mounting base designed for use with a vehicle, and of which is electrically powered by a cigarette lighter outlet.

B. Discussion of the Prior Art

As a preliminary note, it should be stated that there is an ample amount of prior art that deals with blenders. As will be discussed immediately below, no prior art discloses a portable blender that has a mounting base designed for use with a vehicle.

The Navedo et al. (U.S. Pat. No. 6,959,562) discloses a portable frozen drink machine having an AC power adapter or a car lighter adapter. However, the machine does not secure itself to a mounting base that is designed for use with a vehicle.

The Schuecher Patent Application Publication (U.S. Pub. No. 2008/0018303) discloses a cordless power supply to be used to power an electric blender that includes a vehicle accessory power plug adapter. However, the power supply does not involve a portable blender that has a mounting base designed for use with a moving vehicle.

The Parlor, Sr. Patent Application Publication (U.S. Pub. No. 2002/0089894) discloses a device for storing, mixing, and dispensing liquids including a lighter outlet connection. However, the device does not provide portable blending capabilities and mount upon a support that is designed for use with a moving vehicle.

The Forrester Patent (U.S. Pat. No. 4,913,318) discloses a portable beverage dispenser having heating and cooling means and a cigarette lighter plug for connection in a vehicle cigarette lighter socket. However, the beverage dispenser does not include portable blending capabilities and mount upon a support base that is suited for use with a vehicle.

The Balderson Patent (U.S. Pat. No. 3,915,079) discloses a coffee making appliance having a base with a cigarette lighter plug adapter and a recess for mounting a coffee pot. However, the base of the coffee maker does not rotate as the vehicle turns but simply is mounted to a surface inside of the vehicle.

The Nakato et al. Patent Application Publication (U.S. Pub. No. 2007/0119867) discloses a chilled drink preparation control device. However, the chilled preparation drink device does not have a base designed for use with a vehicle, and of which has a cigarette lighter plug.

The Herbert Patent Application Publication (U.S. Pub. No. 2006/0193200) discloses a device for providing a visual indication of the amount of liquid or other materials in a blender cup. However, the blender cup does not include a base that is suited for use in a vehicle, and of which is powered by a cigarette lighter socket of said vehicle.

The Wulf et al. Patent (U.S. Pat. No. 6,609,821) discloses a blender base including a shell of plastic construction that has food processor capabilities. However, the blender base does not have a mount suited for use with a vehicle wherein the base pivots.

The Noles Patent (U.S. Pat. No. 6,037,570) discloses a coffee brewing device for use in a vehicle wherein the base has a power cord with a cigarette lighter adapter. However, the coffee brewing device does not blend the contents contained therein, nor does the base pivot so as to steady the contents contained therein when the vehicle is moving.

While the above-described devices fulfill their respective and particular objects and requirements, they do not describe a portable blender that provides for the advantages of the portable blender. In this regard, the portable blender departs from the conventional concepts and designs of the prior art.

SUMMARY OF THE INVENTION

The invention is an improved portable blender for use in a vehicle that has a self-righting base capable of pivoting in order to balance out the contents contained in the blender while the vehicle is moving. The base also has a power cord with a cigarette lighter adapter.

An object of the invention is to provide a blender that does not spill while inside of a moving vehicle.

A further object of the invention is to provide a base for a portable blender that secures itself to the interior of a vehicle.

A further object of the invention is to power the portable blender via a power cord having a cigarette lighter adapter.

These together with additional objects, features and advantages of the portable blender will be readily apparent to those of ordinary skill in the art upon reading the following detailed description of presently preferred, but nonetheless illustrative, embodiments of the portable blender when taken in conjunction with the accompanying drawings.

In this respect, before explaining the current embodiments of the portable blender in detail, it is to be understood that the portable blender is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable blender. It is therefore important that the claims be regarded as including such equivalent construction insofar as they do not depart from the spirit and scope of the portable blender. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 7 further illustrates a side view of the various components of the invention; and FIG. 8 illustrates an isometric view of the various components of the invention.

DETAILED DESCRIPTION OF THE EMBODIMENT

Figure 1:
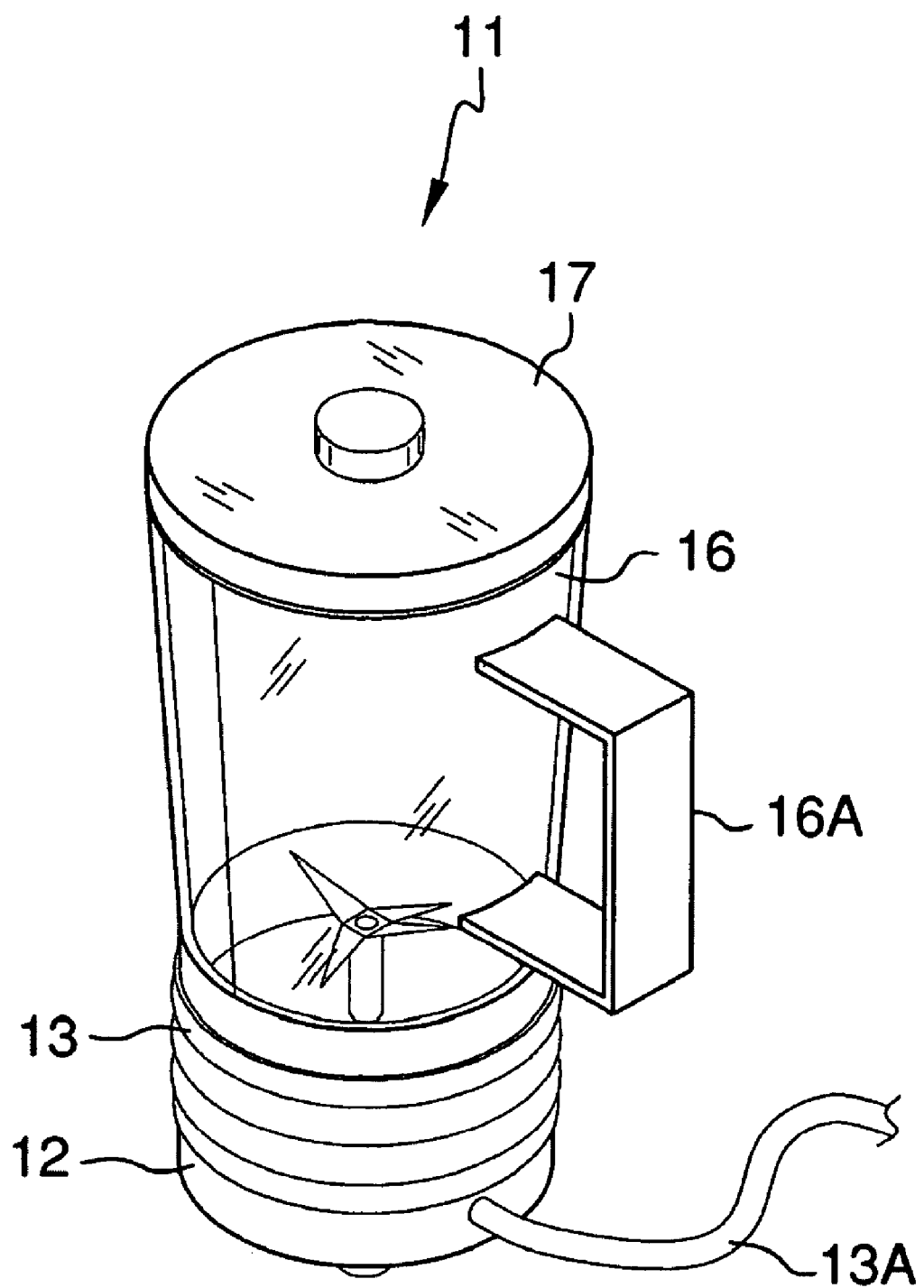
FIG. 1 illustrates a front, isometric view of the portable blender by itself.
Figure 2:
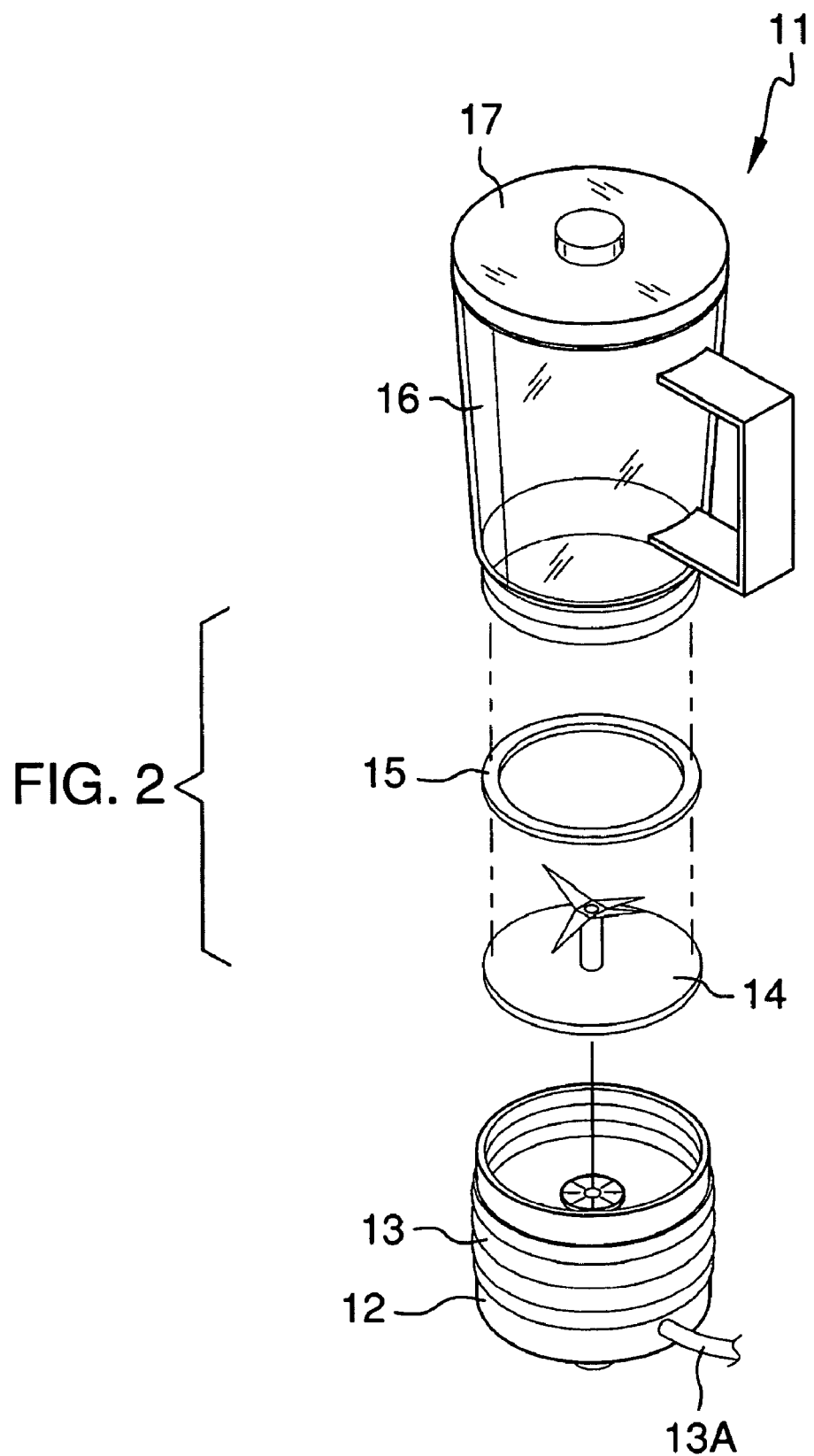
FIG. 2 illustrates an exploded, isometric view of the blender base, the blade, the seal, and the blender container.
Figure 3:
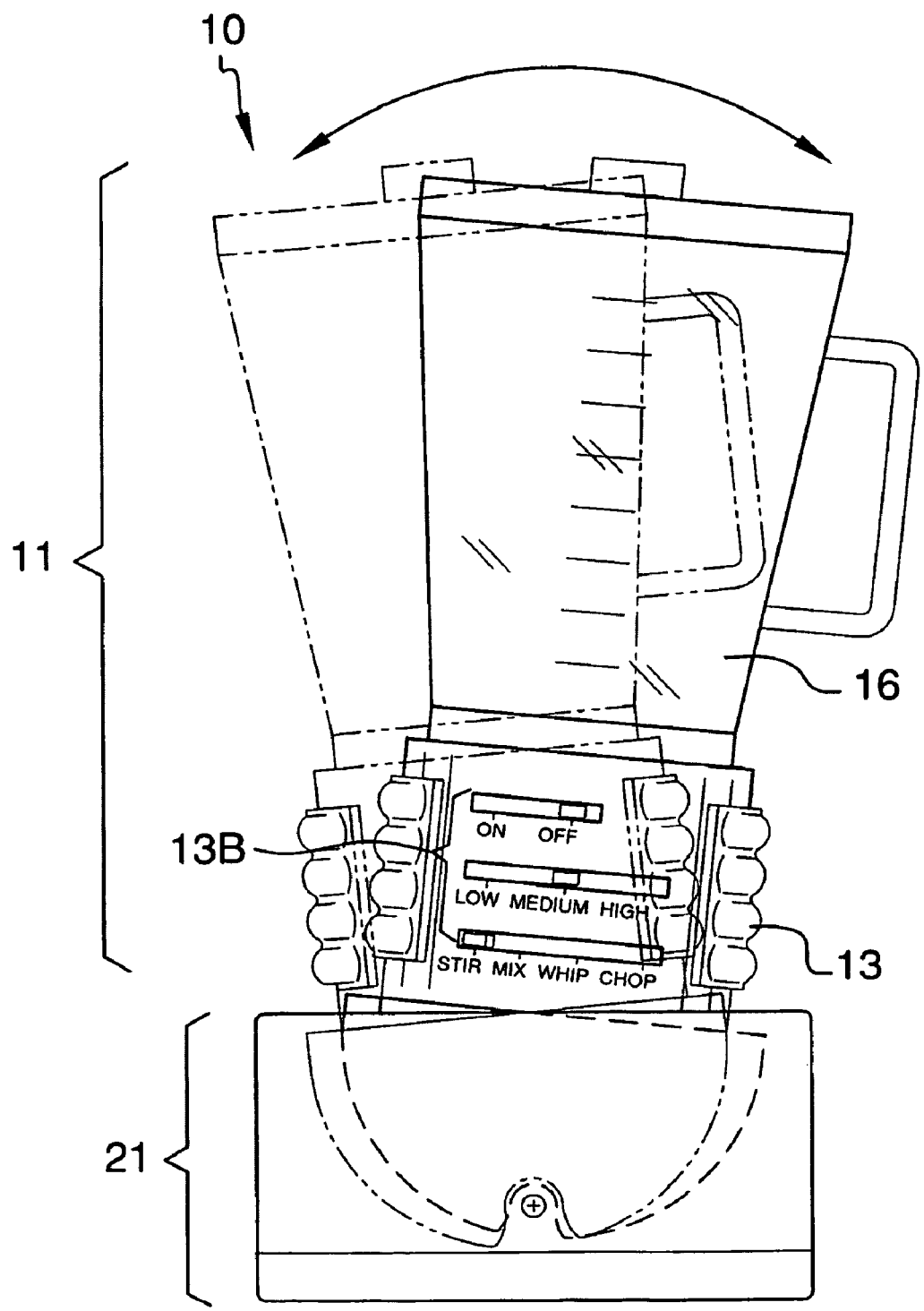
FIG. 3 illustrates a side view of the portable blender swiveling along a single axis within the swiveling base.
Figure 4:
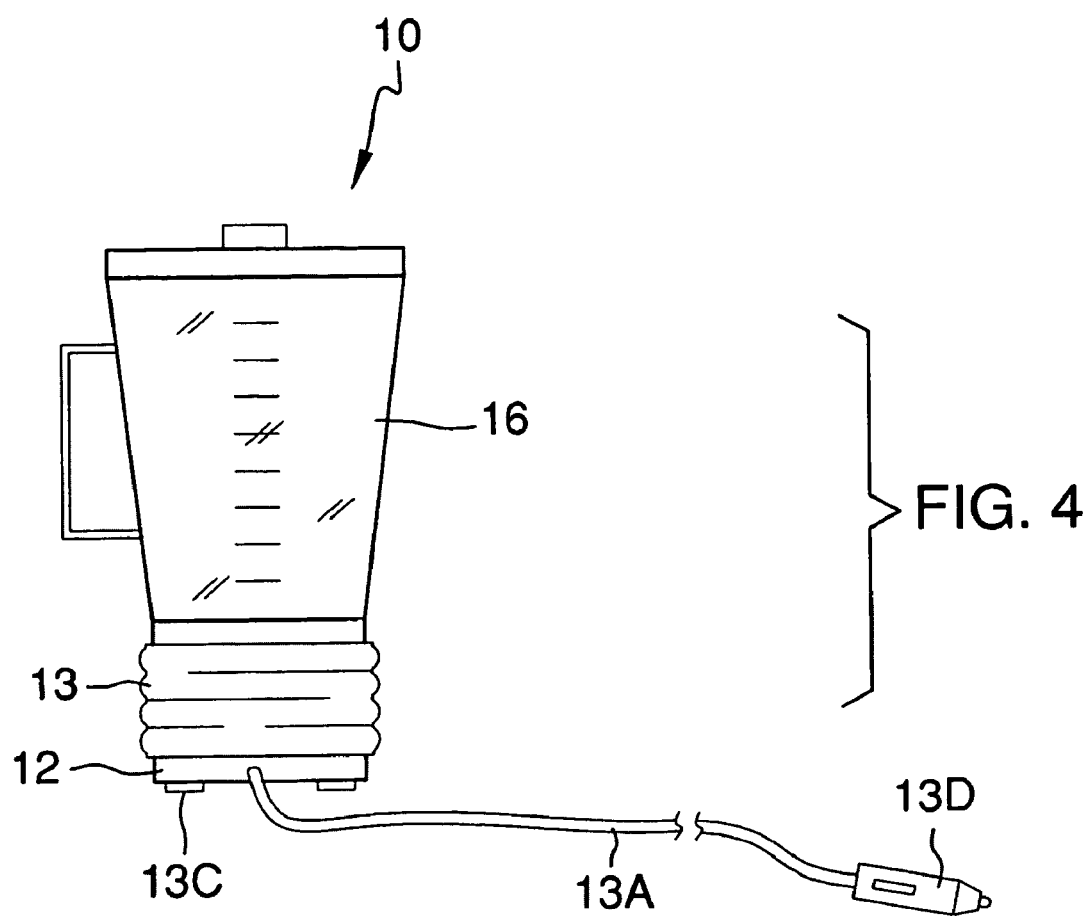
FIG. 4 illustrates a side view of the blender with the electrical cord by itself.
Figure 5:
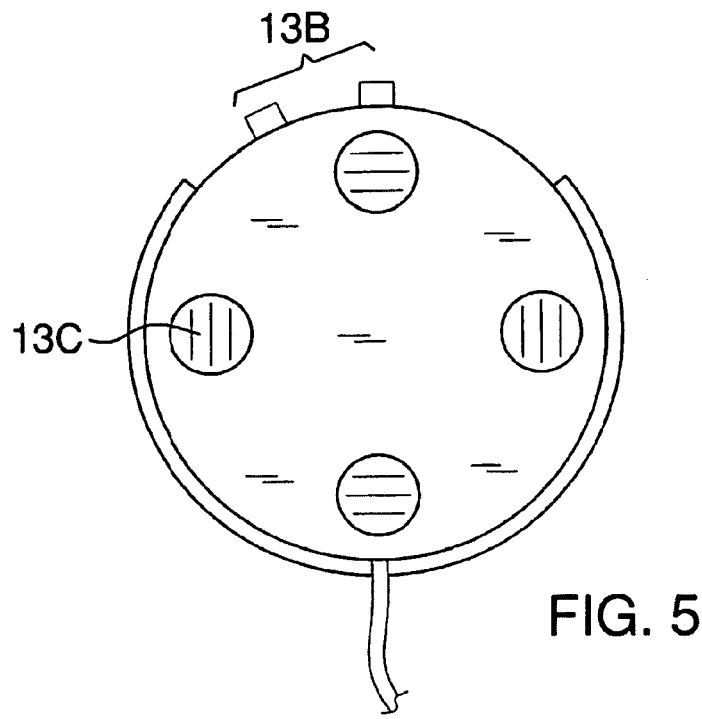
FIG. 5 illustrates a bottom view of the blender base.

Detailed reference will now be made to the preferred embodiment of the present invention, examples of which are illustrated in FIGS. 1-8. A portable blender 10 (hereinafter invention) includes a portable blender 11 and a swiveling means 21.

The portable blender 11 includes a blender plate 12, blender base 13, electrical cord 13A, blade 14, seal 15, blender container 16, blender container handle 16A, and lid 17.

Figure 6:
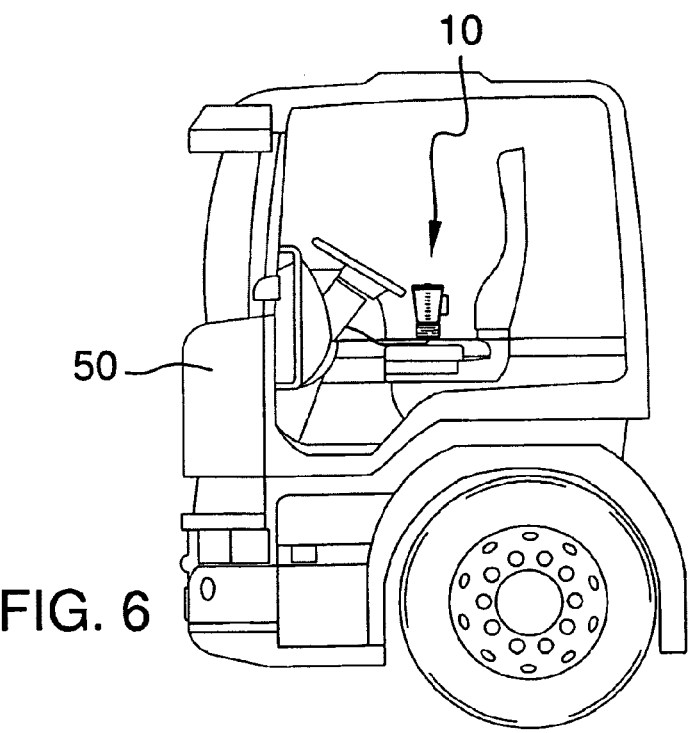
FIG. 6 illustrates the invention in use.

Located on the blender base 13 are a plurality of controls 13B, and a plurality of rubber feet 13C. The blender plate 12 has a plurality of grooves 12A that correlate with the rubber feet 13C of the blender base 13. However, it shall be noted that the invention does not require the use of the rubber feet 13C nor the blender plate 12. The inclusion of the blender plate 12 and the rubber feet 13C insures adaptability of the invention 10 in that the swiveling means 21 and the blender plate 12 may be removed, and the portable blender simply rest inside of a vehicle 50, as depicted in FIG. 6.

The inclusion of the rubber feet 13C insures more overall stability of the invention 10. It shall be noted that other stabilizing means may be used and comprise nylon hook and loop strips, or adhesive. It should be noted that the rubber feet 13C may be made of a material further comprising plastic, metal, or wood.

The electrical cord 13A has a cigarette outlet 13D located on an end of the electrical cord 13A. However, it shall be noted that the portable blender 11 may be powered by alternative powering means comprising a plurality of batteries, or a solar cell array.

The swiveling means 21 includes a first swiveling bowl 22, a second swiveling bowl 23, and a swiveling base 24. The first swiveling bowl 22 includes a recess 22A along a top surface, which further supports the blender plate 12 and the blender base 13. The first swiveling bowl 22 has along a bottom surface an obviously domed-shape bottom. About the middle of the outer domed-shaped surface of the first swiveling bowl 22, is a first axial groove 22B.

The second swiveling bowl 23 has a domed-shaped cavity 23A located along a top surface of the second swiveling bowl 23. The second swiveling bowl 23 also has a swiveling bar 23B mounted within the cavity 23A via mounting screws 23C. The swiveling bar 23B interacts with the first axial groove 22B to enable the first swiveling base 22 to rotate in a first axis within the second swiveling bowl 23.

The second swiveling bowl 23 also includes a generally domed-shaped bottom surface having a second axial groove 23D.

The swiveling base 24 includes a bowl-shaped cavity 24A, swiveling bar 24B, screws 24C to mount the swiveling bar 24B within the cavity 24A. The second axial groove 23D rests upon the swiveling bar 24B and enables the second swiveling base 23 to rotate in a second axis within the swiveling base 24.

It shall be further noted that the swiveling base 21 may in the alternative have a single rotational axis involving a first swiveling bowl and a swiveling base.

It shall be noted that the orientation of the first rotational axis shall be perpendicular with respect to the second rotational axis. Thus, the swiveling means 21 enables the portable blender 11 to horizontally rotate 360 degrees about the swiveling means 21. It is being asserted that the inclusion of the swiveling means 21 enables the invention 10 to be more spill-proof than a typical blender would be in a moving vehicle.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable blender for use inside of a vehicle comprising:
    (a) a blender;
        wherein the blender is used for blending food and/or liquids into a shake;
    (b) a swiveling base;
        wherein the swiveling base supports the blender;
        wherein the swiveling base enables the blender to rotate about a rotational axis plane in order to balance the contents contained inside of the blender;
        wherein the swiveling base has a first swiveling bowl, a second swiveling base, and a swiveling base;
        wherein the first swiveling bowl has a first axial groove;
        wherein the second swiveling bowl has a swiveling bar and a second axial groove;
        wherein the swiveling base has a swiveling bar;
        wherein the first swiveling base can rotate about a first rotational axis via the rotational bar and first axial groove;
        wherein the second swiveling base can rotate about a second rotational axis via the rotational bar and the second axial groove;
    (c) a power cord having a cigarette lighter adapter;
        wherein the cigarette lighter adapter is for use with a cigarette lighter socket of a vehicle.

2. The portable blender as described in claim 1 wherein the blender has a plurality of controls located on the blender.

3. The portable blender as described in claim 1 wherein the first rotational axis is perpendicular with the second rotational axis.

* * * * *